United States Patent
Wang et al.

(10) Patent No.: US 7,589,982 B2
(45) Date of Patent: Sep. 15, 2009

(54) SYNCHRONOUS RECTIFIER FORWARD CONVERTER WITH REVERSE CURRENT SUPPRESSOR

(75) Inventors: Kuan-Sheng Wang, Taoyuan (TW); Tian-Hua Liu, Taipei (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 338 days.

(21) Appl. No.: 11/627,368

(22) Filed: Jan. 25, 2007

(65) Prior Publication Data

US 2008/0055944 A1    Mar. 6, 2008

(30) Foreign Application Priority Data

Sep. 1, 2006    (TW) .............................. 95132489 A

(51) Int. Cl.
*H02M 3/335* (2006.01)
(52) U.S. Cl. .................... 363/21.06; 363/21.08; 363/89
(58) Field of Classification Search ............. 363/21.06, 363/21.08, 89
See application file for complete search history.

(56) References Cited

U.S. PATENT DOCUMENTS

| | | | |
|---|---|---|---|
| 6,456,510 B1 * | 9/2002 | Patel et al. ............... | 363/21.06 |
| 7,054,168 B1 * | 5/2006 | Fronk ....................... | 363/21.06 |
| 2002/0191422 A1 * | 12/2002 | Takagi et al. .............. | 363/21.06 |
| 2004/0136207 A1 * | 7/2004 | Havanur ................... | 363/21.06 |
| 2005/0248964 A1 * | 11/2005 | Dalal ....................... | 363/21.08 |
| 2006/0098465 A1 * | 5/2006 | Fronk ....................... | 363/21.06 |
| 2007/0097714 A1 * | 5/2007 | Cebry ...................... | 363/21.06 |

* cited by examiner

*Primary Examiner*—Jeffrey L Sterrett

(57) ABSTRACT

Disclosed is a synchronous forward converter having a reverse current suppressor connected to the gate of a freewheel switch. The reverse current suppressor is configured to receive a control input signal generated by an internal circuitry of a power supply system where the forward converter locates, such as an enable signal, to detect the power-off of the forward converter, and in response thereto turn off the freewheel switch during the interruption of the input power of the forward converter. Alternatively, the reverse current suppressor is configured to detect the decay of the input voltage across the input bulk capacitor located on the primary side of a transformer of the forward converter, and turn off the freewheel switch when the voltage across the secondary side of the transformer is decayed to be smaller than the output voltage of the forward converter.

16 Claims, 18 Drawing Sheets

SYNCHRONOUS RECTIFIER FORWARD CONVERTER WITH REVERSE CURRENT SUPPRESSOR

FIELD OF THE INVENTION

The present invention is related to a synchronous rectifier forward converter, and more particularly to a synchronous rectifier forward converter with a reverse current suppressor, in which the reverse current suppressor is configured to timely turn off the freewheel switch located within the synchronous rectifier, so as to suppress the reverse current generated in the synchronous rectifier when the input voltage of the forward converter is interrupted due to the shutdown of the forward converter.

BACKGROUND OF THE INVENTION

In a typical forward converter, a main switch is placed on the primary side of the transformer and connected in series with the primary winding of the transformer, and a rectifier circuit which is made up of rectifying diodes is placed on the secondary side of the transformer. The magnetizing inductance of the primary winding of the transformer is configured to receive the current from the voltage input terminal of the forward converter and store energy therein, and transfer the stored energy to the secondary side of the transformer according to the on/off operations of the main switch. The rectifier circuit disposed at the secondary side of the transformer is used to rectify the AC voltage induced on the secondary side of the transformer into a rectified DC voltage. The rectified DC voltage is then smoothed to generate an output DC voltage for use by a load. Because diodes can cause considerable conduction loss during the switching operation, the rectifying diodes within the rectifier circuit have been replaced with transistors so as to implement a synchronous rectifier in a conventional forward converter. The forward converter using a synchronous rectifier can reduce the power loss of the converter and improve the overall efficiency of the converter. However, transistor is a circuit element with bidirectional conductivity, and thus requires a sophisticated driving circuit to drive the synchronous rectifier switch of the synchronous rectifier.

FIG. 1 shows the circuit construction of a conventional synchronous rectifier forward converter. The synchronous rectifier forward converter of FIG. 1 includes a transformer T1 having a primary winding Np and a secondary winding Ns. One end of the primary winding Np is connected to an input DC voltage Vin and configured to store the energy from the input DC voltage Vin in the magnetizing inductance of the primary winding (not shown). The other end of the primary winding Np is connected in series with a main switch Q1 whose switch operation is manipulated by a pulse-width modulator (PWM) 50. The main switch Q1 is generally implemented by a MOSFET having a drain terminal connected to the primary winding Np and a gate terminal connected to the pulse-width modulator 50 and a source terminal connected to ground. The energy stored in the primary side of the transformer T1 is transferred to the secondary side of the transformer T1 according to the on/off operations of the main switch Q1, and thereby inducing an AC voltage across the secondary winding Ns. A synchronous rectifier (Q2, Q3) and a filtering circuit (Lo, Co) are placed on the secondary side of the transformer T1, in which the synchronous rectifier (Q2, Q3) is configured to perform switching operation in synchronization with the main switch Q1 so as to convert the AC voltage across the secondary winding Ns into a rectified DC voltage. The rectified DC voltage is processed by the filtering circuit which is made up of an output inductor Lo and an output capacitor so that the high-frequency harmonics of the rectified DC voltage is removed, in which the output inductor Lo is implemented in the form of a transformer. Therefore, an output voltage Vout is generated across the output capacitor Co and provided to a load Ro.

The synchronous rectifier shown in FIG. 1 is a self-driven synchronous rectifier including a forward switch Q2 and a freewheel switch Q3. The forward switch Q2 also has a drain terminal connected to the secondary winding Ns, a gate terminal connected to one end of an auxiliary winding Na located at the secondary side of the transformer T1, and a source terminal connected to the negative voltage output terminal of the forward converter. The secondary voltage induced across the auxiliary winding Na is used as a gate driving signal for the forward switch Q2. The freewheel switch Q3 also has a drain terminal connected to the positive voltage rail of the output DC voltage Vout, a gate terminal connected to the auxiliary winding of the output inductor Lo, and a source terminal connected to negative voltage output terminal of the forward converter. The voltage induced across the auxiliary winding of the output inductor Lo is used as a gate driving signal for the freewheel switch Q3. The operation of the synchronous rectifier of FIG. 1 is described as follows. When the main switch Q1 is ON, the energy stored in the primary side of the transformer T1 is transferred to the secondary side of the transformer T1, and thereby inducing a positive voltage across the secondary winding Ns. In the meantime, the gate driving signal received by the gate terminal of the forward switch Q2 is a positive voltage and thus the forward switch Q2 is turned on. Hence, the forward switch Q2 can provide a current path between the secondary winding Ns and the negative voltage output terminal of the forward converter, such that an inductor current $I_L$ can flow from the secondary winding Ns to the output inductor Lo so as to charge the output inductor Lo, and thereby generating a positive voltage across the main winding of the output inductor Lo. Because the polarity of the main winding of the output inductor Lo is reverse to the polarity of the auxiliary winding of the output inductor Lo, a negative voltage is induced across the auxiliary winding of the output inductor Lo. Therefore, the gate driving signal received by the gate terminal of the freewheel switch Q3 is a negative voltage, and thereby turning off the freewheel switch Q3. When the main switch Q1 is OFF, the transformer enters the reset process, and thereby inducing a negative voltage across the secondary winding Ns. In the meantime, the gate driving signal received by the gate terminal of the forward switch Q2 is a negative and thereby turning off the forward switch Q2. Here, the energy stored in the output inductor Lo is discharged to the output capacitor Co by the inductor current $I_L$, and thereby generating an output DC voltage Vout across the output capacitor Co and inducing a negative voltage across the main winding of the output inductor Lo. Because the polarity of the main winding of the output inductor Lo is reverse to the polarity of the auxiliary winding of the output inductor Lo, a positive voltage is induced across the auxiliary winding of the output inductor Lo. Here, the gate driving signal received by the gate terminal of the freewheel switch Q3 is a positive voltage, and thereby turning on the freewheel switch Q3. Hence, the freewheel switch Q3 can provide a current path between the positive voltage rail and the negative voltage output terminal of the forward converter.

Although the synchronous rectifier can provide several advantages such as low power loss and high conversion efficiency, some potential risks would occur at the instant of the start-up or the shutdown of the forward converter. The major risk is caused by the reverse current which flows from the output capacitor Co to the secondary winding Ns. As stated above, the synchronous switch (Q2, Q3) is made up of transistors having bidirectional conductivity. Therefore, the synchronous switch (Q2, Q3) requires a driving circuit to control its on/off operations. However, no matter whether the synchronous switches of the synchronous rectifier (Q2, Q3) uses a self-driven mechanism or a control-driven mechanism, the source of the gate driving signal stems from the pulse-width modulator 50. Therefore, when the forward converter shuts down or the input power of the forward converter is interrupted, the pulse-width modulator 50 will cease operation and thus the gate driving signal for manipulating the synchronous rectifier (Q2, Q3) will be stopped as well, and the forward switch Q2 will turn off accordingly. Nonetheless, the gate terminal of the freewheel switch Q3 still keeps the residue energy remained during the ON period. Such situation is particularly feasible under a light-load or a no-load condition. Hence, a current loop is formed between the output inductor Lo and the output capacitor Co due to the ever-conducting freewheel switch Q3. Here, the voltage across the secondary winding Ns is zero. Accordingly, the flow direction of the inductor current is $I_L$ reversed. Because the gate terminal of the freewheel switch Q3 is driven in a continuous manner, the amount of the reverse current will increase as well until the energy of the gate terminal of the freewheel switch Q3 has dropped down to be smaller than the threshold voltage. Under this condition, the freewheel switch Q3 will turn off and the variance of the reverse current causes sharp voltage spikes between the drain terminal and the source terminal of the synchronous switches Q2 and Q3. These voltage spikes would damage the power semiconductor devices within the synchronous rectifier. What is worse, the instantaneous voltage value of these voltage spikes would exceed the rated voltage of the power semiconductor devices and burn down the power semiconductor devices.

FIGS. 2(A) to 2(E) illustrate various operating modes of the synchronous rectifier forward converter of FIG. 1 during the shutdown process, and FIG. 3 illustrates the waveforms of the inductor current, the gate-source voltage and the drain-source voltage of the freewheel switch within the synchronous rectifier forward converter of FIG. 1. FIG. 2(A) illustrates the operating mode of the synchronous rectifier forward converter during a normal operating process, in which the pulse-width modulator 50 is configured to continuously provide pulse-width modulation signals to the gate of the main switch Q1. Therefore, the energy stored in the primary side of the transformer T1 can be transferred to the secondary side of the transformer T1. In the meantime, the flow of the inductor current $I_L$ is directed from the secondary winding Ns to the output capacitor Co. When the main switch Q1 is ON, the forward switch Q2 is turned on to enable the output inductor Lo, the output capacitor Co and the forward switch Q2 to form a current loop. When the main switch Q1 is OFF, the freewheel switch Q3 is turned on to enable the output inductor Lo, the output capacitor Co and the freewheel switch Q3 to form a current loop. The waveform diagram for illustrating this operation mode is represented in the time period t0 to t1 of FIG. 3.

FIG. 2(B) illustrates the operating mode of the synchronous rectifier forward converter as the forward converter is shut down or the input power of the forward converter is interrupted. Under this condition, the power supply for the pulse-width modulator 50 is unavailable, and thus the pulse-width modulator 50 can not provide pulse-width-modulation signals so that the energy transfer initiated by the primary side of the transformer T1 is stopped. Therefore, the voltage across the secondary winding Ns is zero and the secondary winding Ns can not charge the output inductor Lo to store energy in the output inductor Lo. In the meantime, the gate voltage of the freewheel switch Q3 is not dropped down to zero immediately. That is, the freewheel switch Q3 can not be turned off immediately but maintain conducting for a short time, which causes the voltage across the output capacitor Co to be larger than the voltage across the secondary winding Ns. Therefore, the output inductor Lo, the output capacitor Co and the freewheel switch Q3 form a current loop, in which the inductor $I_L$ reversely flows from the drain terminal of the freewheel switch Q3 to the source terminal of the freewheel switch Q3 so that the output capacitor Co can charge the output inductor Lo. The waveform for illustrating this operating mode is represented in the time period of t1 to t2 of FIG. 3.

FIG. 2(C) illustrates the operating mode subsequent to the operating mode of FIG. 2(B). In this mode, the output capacitor Co will continuously charge the output inductor Lo. Because the gate voltage of the freewheel switch Q3 has not decayed to the threshold voltage, the reverse current from the output capacitor Co will continue flowing. The waveform for illustrating this operating mode is represented in the time period of t2 to t3 of FIG. 3.

FIG. 2(D) illustrates the operating mode subsequent to the operating mode of FIG. 2(C). In this mode, the gate voltage of the freewheel switch Q3 will be decayed to be smaller than the threshold voltage so as to turn off the freewheel switch Q3. In the meantime, the reverse current flowing through the output inductor Lo will be maximized. Because the initial value of the junction capacitance between the source and the drain of the forward switch Q2 and the freewheel switch Q3 is zero, the instantaneous current of the reverse current will charge the junction capacitance. Therefore, voltage spikes will occur between the drain and source of the forward switch Q2 and the freewheel switch Q3. The waveform for illustrating this operating mode is represented in the time period of t3 to t4 of FIG. 3.

FIG. 2(E) illustrates the operating mode subsequent to the operating mode of FIG. 2(D). In this mode, when the reverse current is maximized, the cycle of the resonance between the output inductor Lo and the output capacitor Co will be finished. In the meantime, the reverse current will diminish and the flow of the inductor current $I_L$ will revert to the operating mode of FIG. 2(A). Here, the freewheel switch Q3 will turn on again by the gate driving signal provided by the auxiliary winding of the output inductor Lo, and the inductor-capacitor resonance of the next cycle will start. The waveform for illustrating this operating mode is represented in the time period of t4 to t5 of FIG. 3.

According to the results of analysis, it can be understood that the occurrence of the reverse current and the short-circuit problems caused by the shutdown of the forward converter are attributed to the delayed turn-off of the freewheel switch Q3. Hence, if it possible to timely turn off the freewheel switch Q3 when the input power is interrupted or before the resonance between the output inductor Lo and the output capacitor Co starts, the reverse current can be inhibited and the damages caused by the voltage spikes can be suppressed. To this end, it would be an ideal solution to devise a controller with a simple circuit architecture and cost-effectiveness to detect the shutdown of the forward converter or the occurrence of the reverse current and drive the freewheel switch Q3 to turn off in good time. The present invention can satisfy these needs.

SUMMARY OF THE INVENTION

An object of the present invention is to provide a synchronous rectifier forward converter having a reverse current suppressor, in which the reverse current suppressor has a simple circuit architecture and control mechanism and does not need to be connected across the primary side and the secondary side of the transformer.

According to a primary aspect of the present invention, a synchronous rectifier forward converter includes a transformer having a primary winding and a secondary winding, the primary winding is connected in series with a main switch and configured to transferred the energy stored therein to the secondary side of the transformer according to the on/off operations of the main switch, and a synchronous rectifier and an output filter connected to the secondary winding. Also, a reverse current suppressor is configured to suppress the reverse current as a result of the resonance of the output filter when the forward converter is shut down or before the reverse current is occurred. The reverse current suppressor has an input terminal for receiving an enable signal from an internal circuitry of a power supply system where the forward converter locates and determining if the forward converter is shut down. The reverse current suppressor can send a turn-off signal to turn off the freewheel switch of the synchronous rectifier according to the enable signal when the input power of the forward converter is interrupted. Alternatively, the input terminal of the reverse current suppressor can receive the induced energy transmitted from the primary side of the transformer to detect if the voltage across the secondary winding is smaller than the output voltage of the forward converter when the input power is interrupted, so as to determine if a reverse current is generated. When the voltage across the secondary winding is smaller than the output voltage of the forward converter when the input power is interrupted, a turn-off signal is sent to turn off the freewheel switch of the synchronous rectifier. The reverse current suppressor further includes an output terminal for sending the turn-off signal to the gate terminal of the freewheel switch of the synchronous rectifier so as to suppress the reverse current.

Now the foregoing and other features and advantages of the present invention will be best understood through the following descriptions with reference to the accompanying drawings, wherein:

DETAILED DESCRIPTION OF THE PREFERRED EMBODIMENT

A preferred embodiment embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 1:
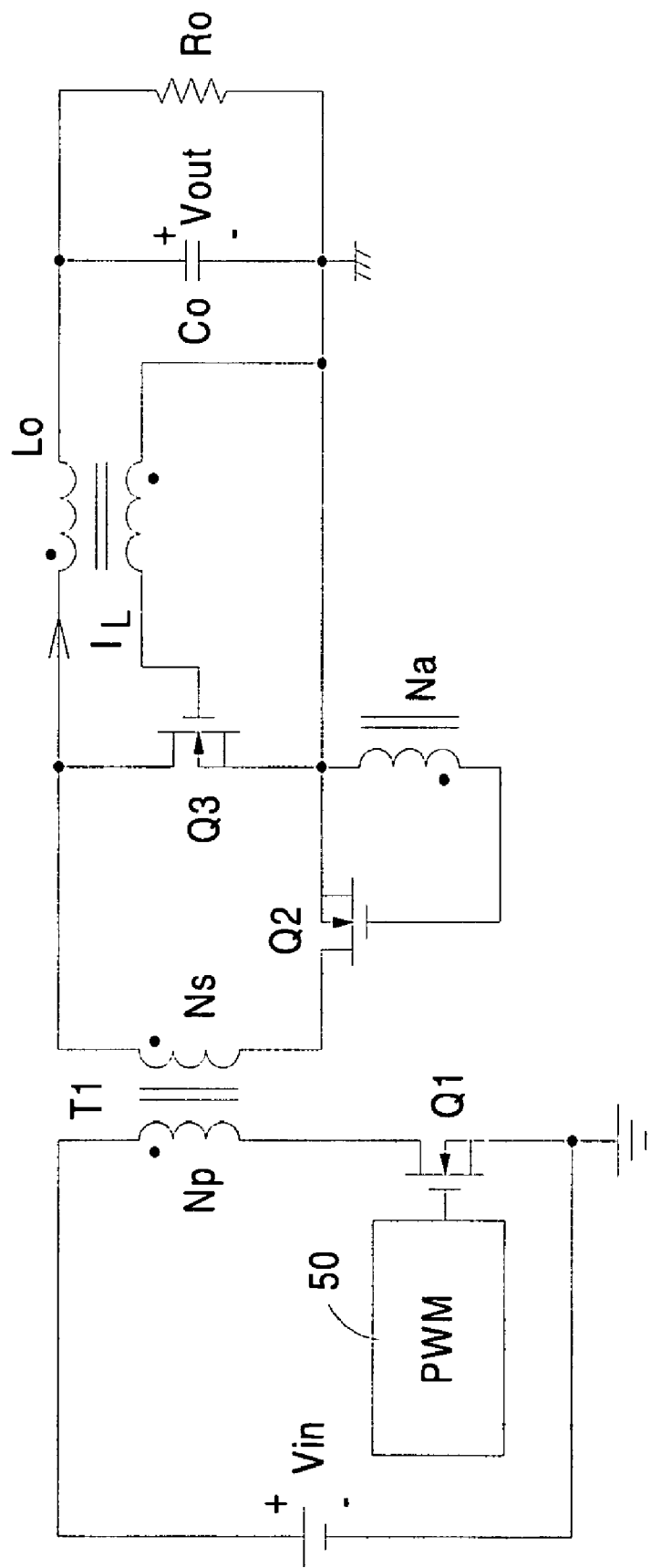
FIG. 1 is a diagrammatic view showing the circuit architecture of a synchronous rectifier forward converter according to the prior art.
Figure 2A:
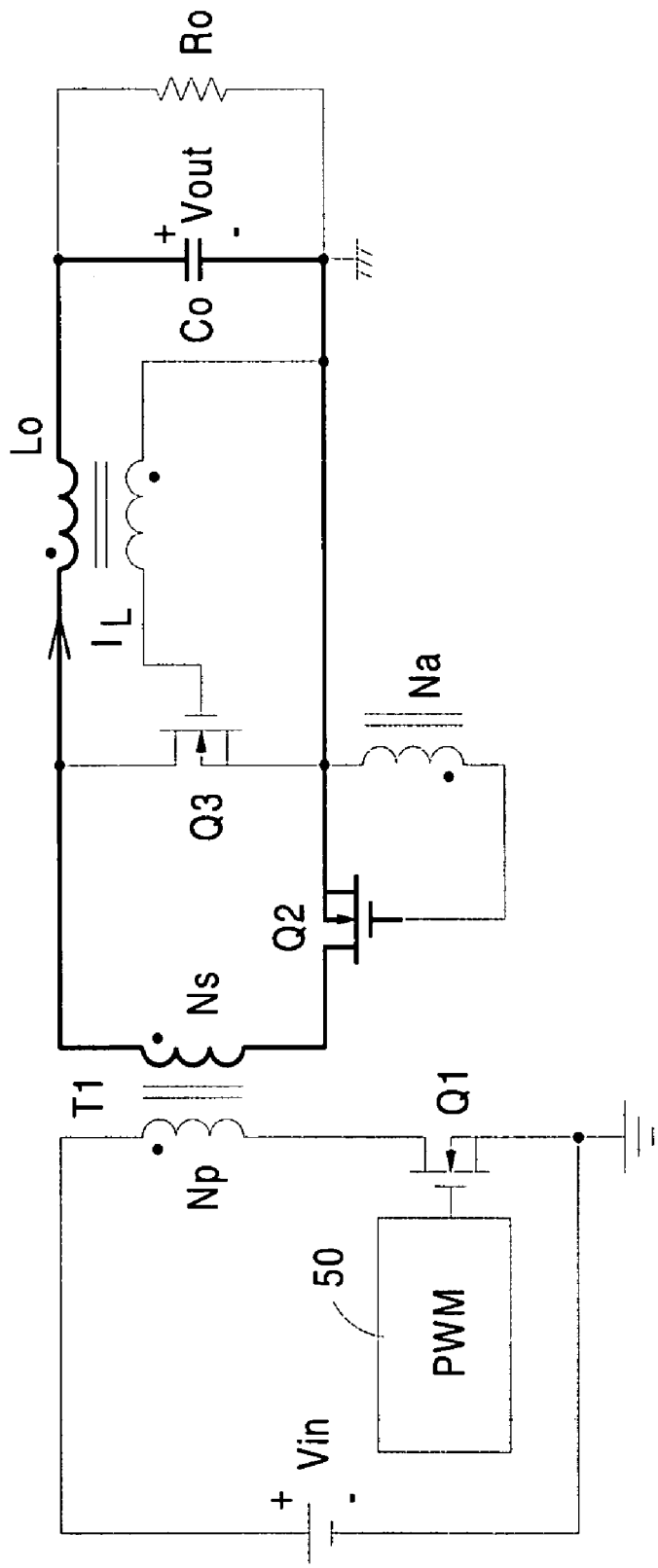
FIGS. 2(A) to 2(E) are diagrammatic view showing a variety of operating modes of the synchronous rectifier forward converter of FIG. 1.
Figure 2B:
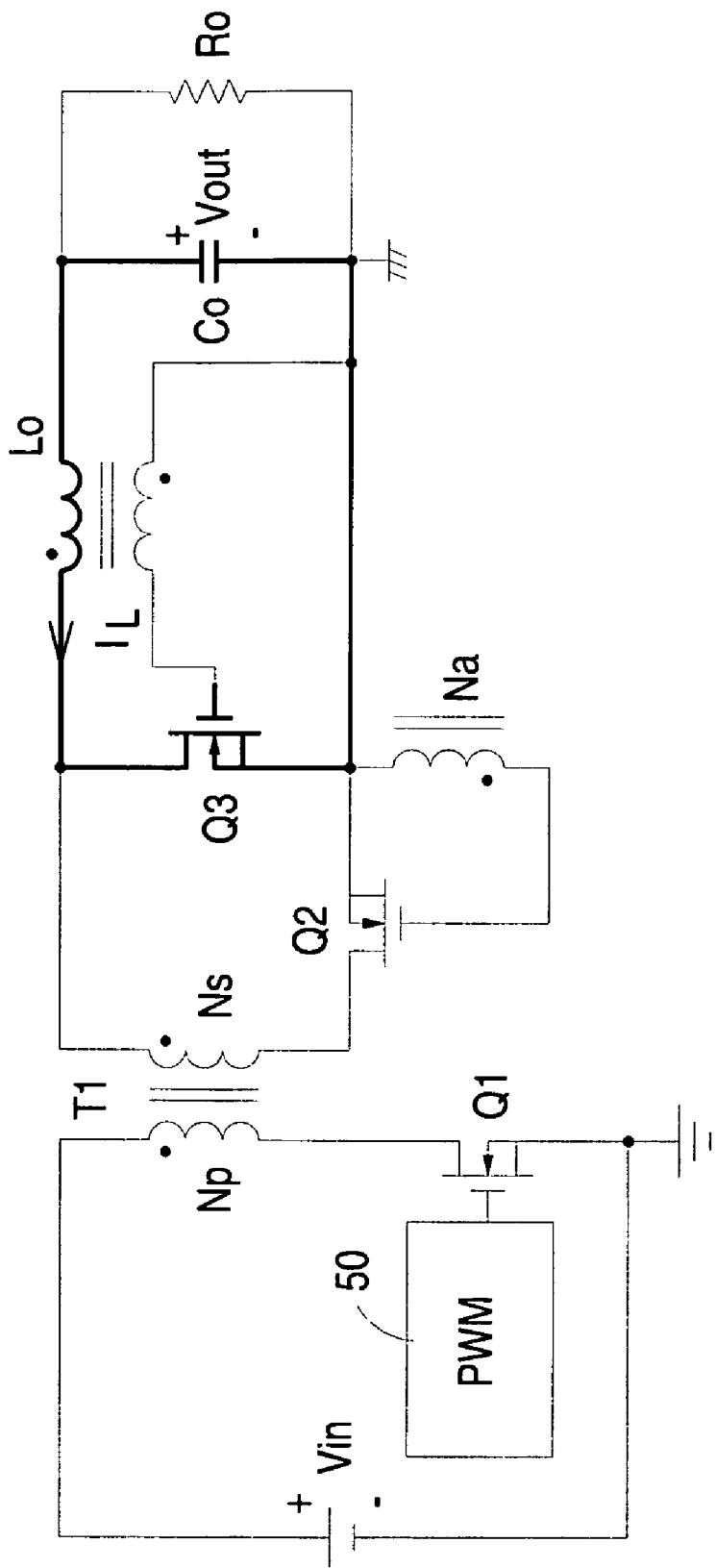
Figure 2C:
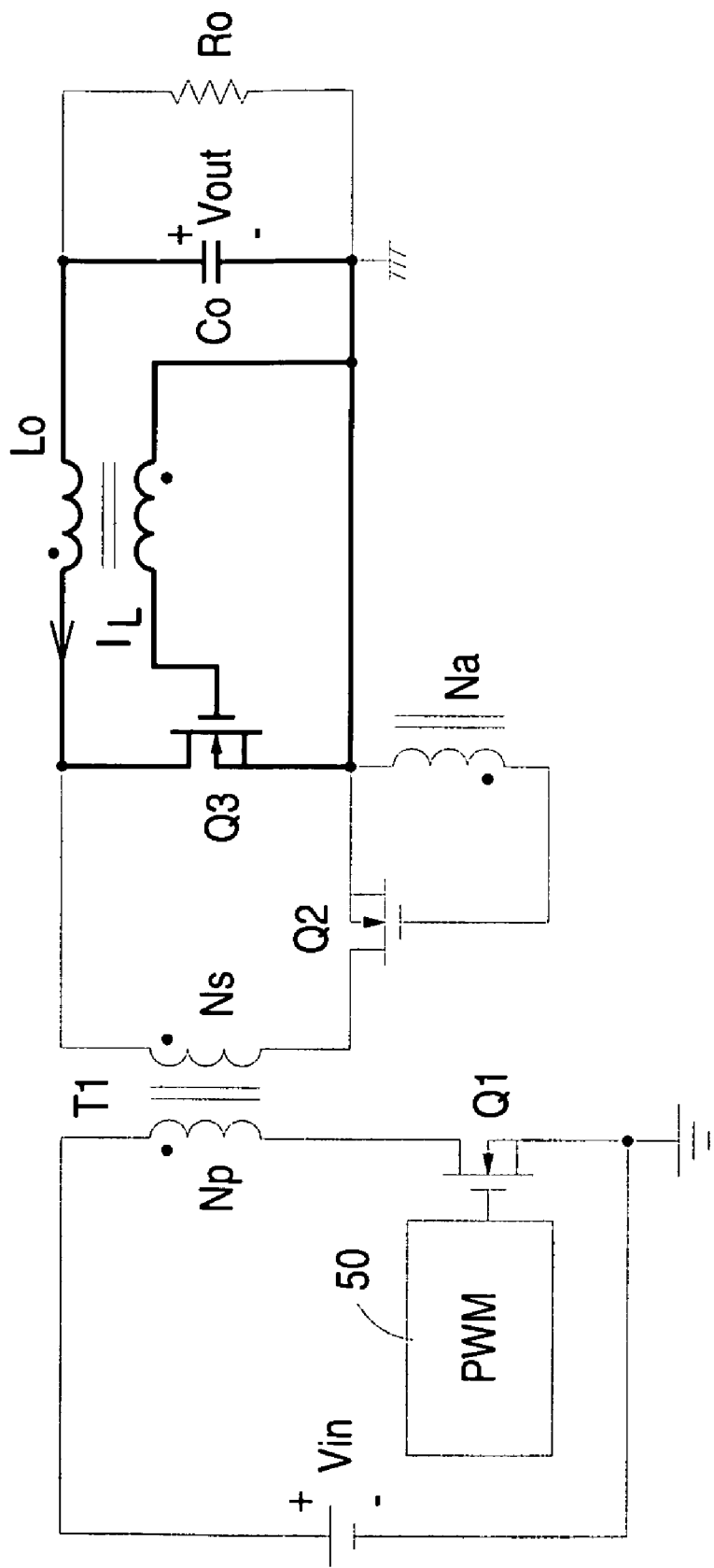
Figure 2D:
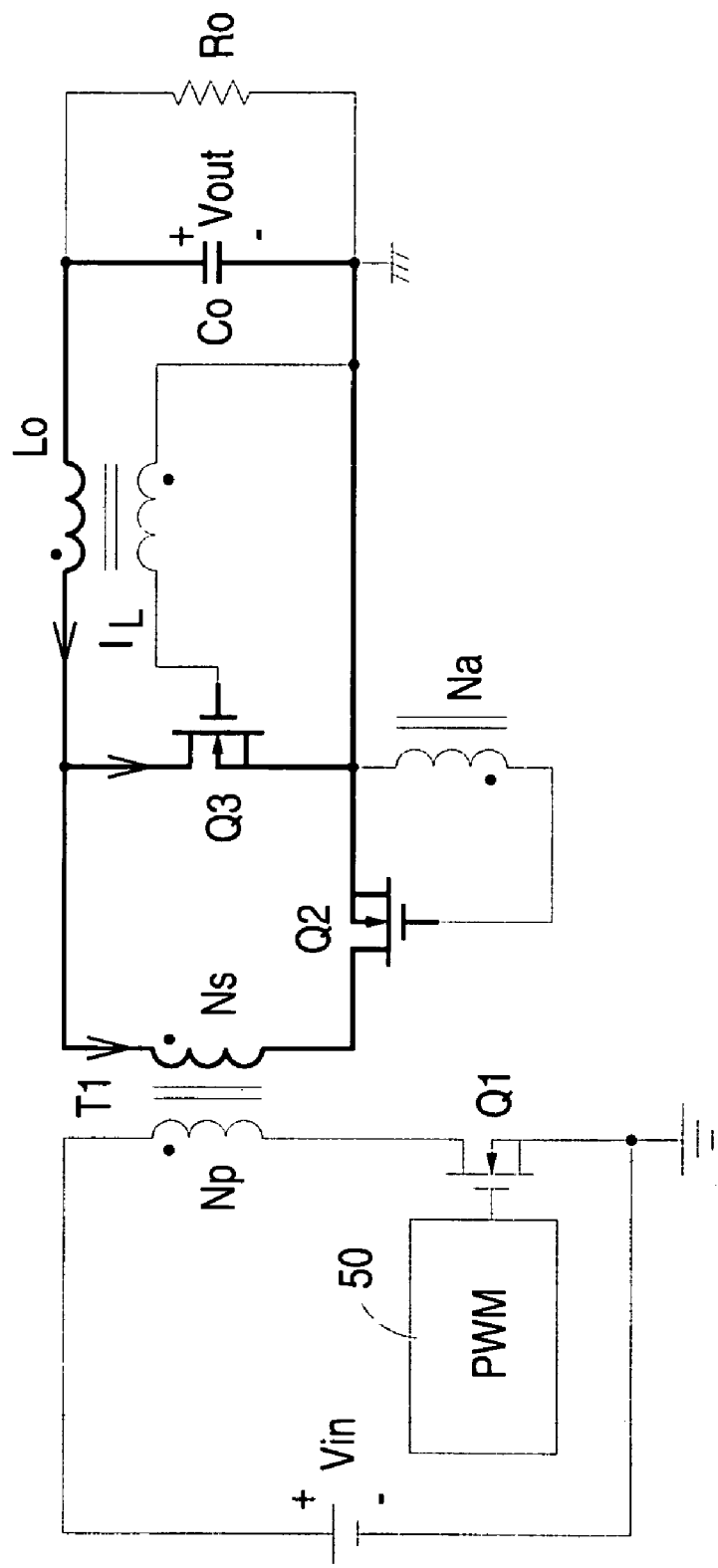
Figure 2E:
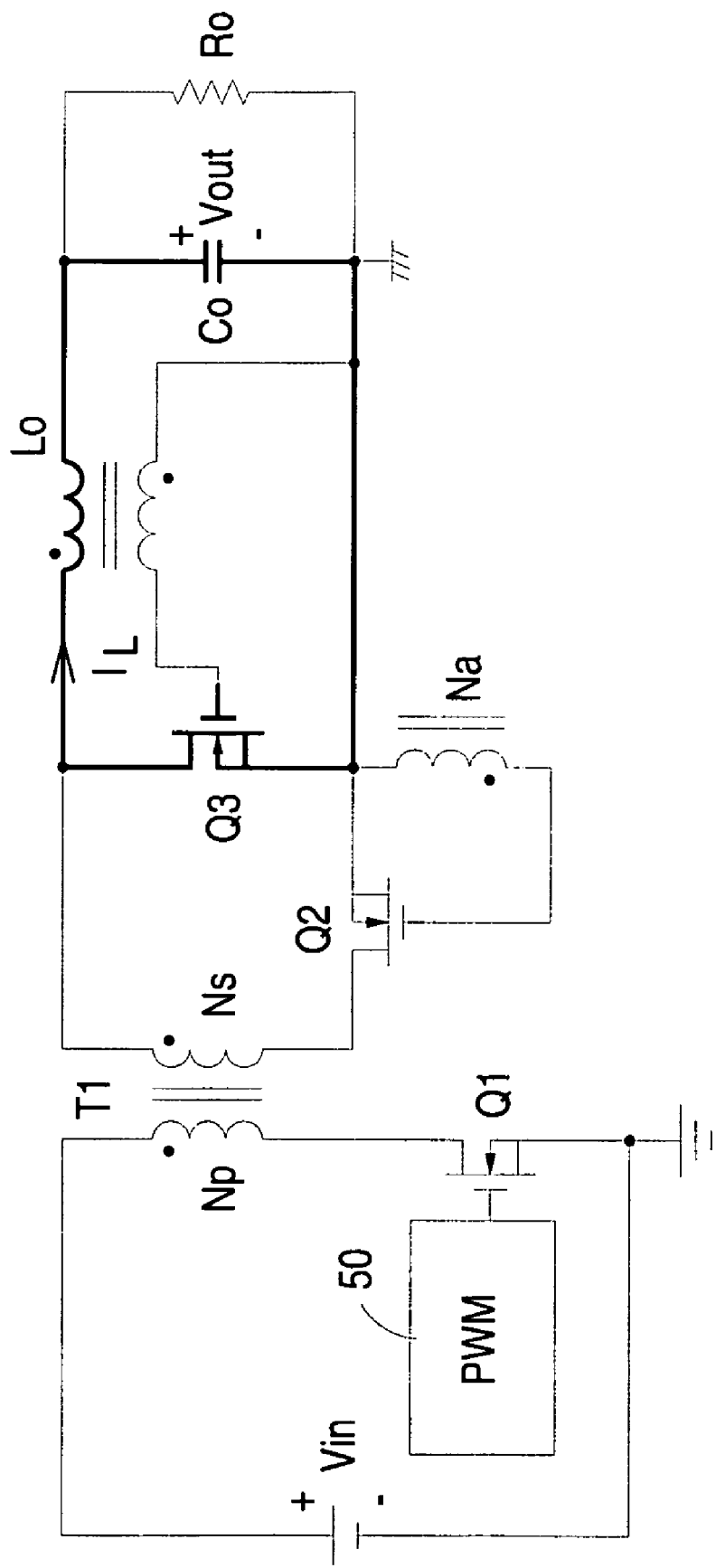
Figure 3:
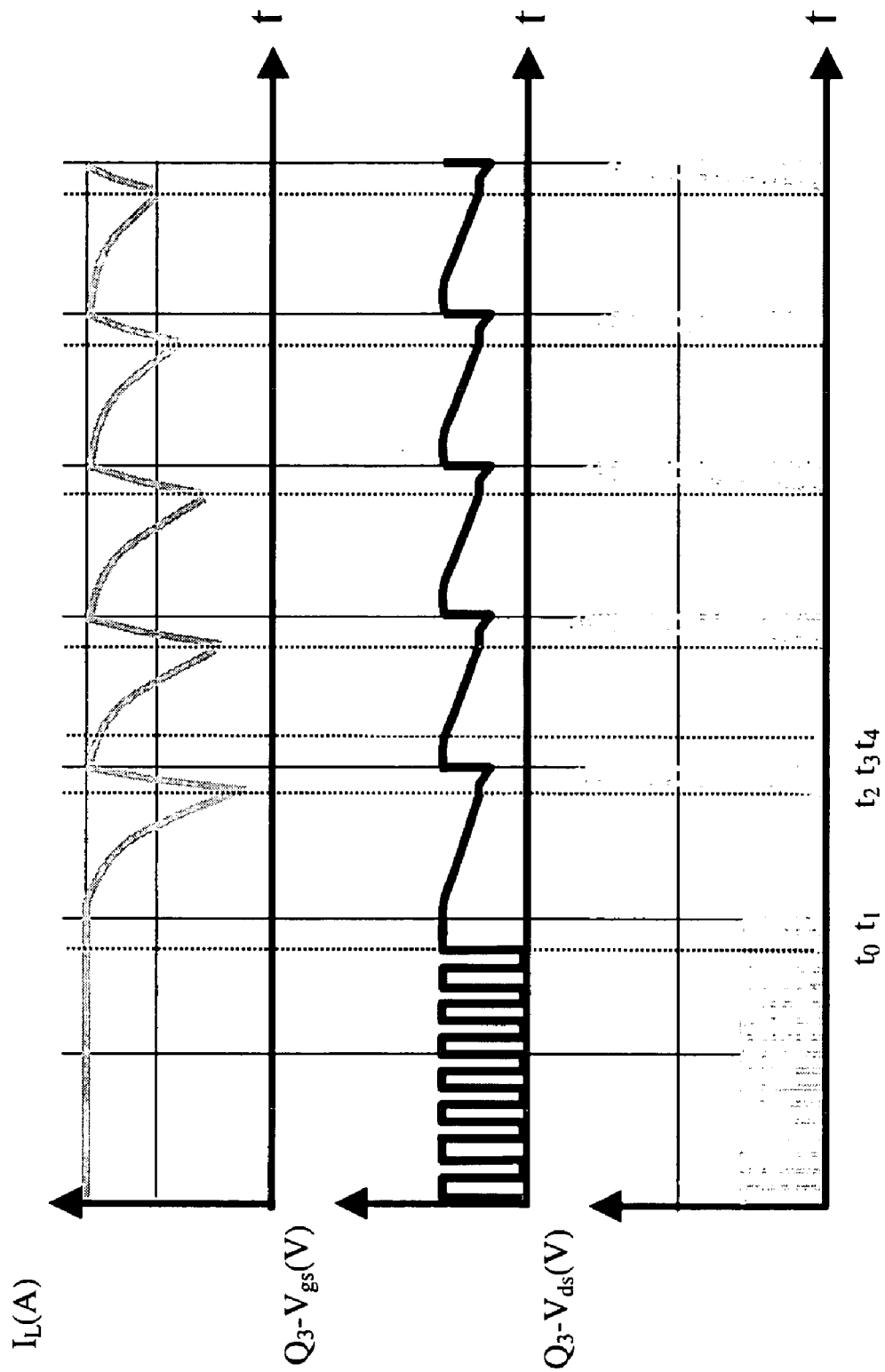
FIG. 3 shows the waveforms of the inductor current, the gate-source voltage and the drain-source voltage of the freewheel switch of the synchronous rectifier forward converter of FIG. 1.
Figure 4:
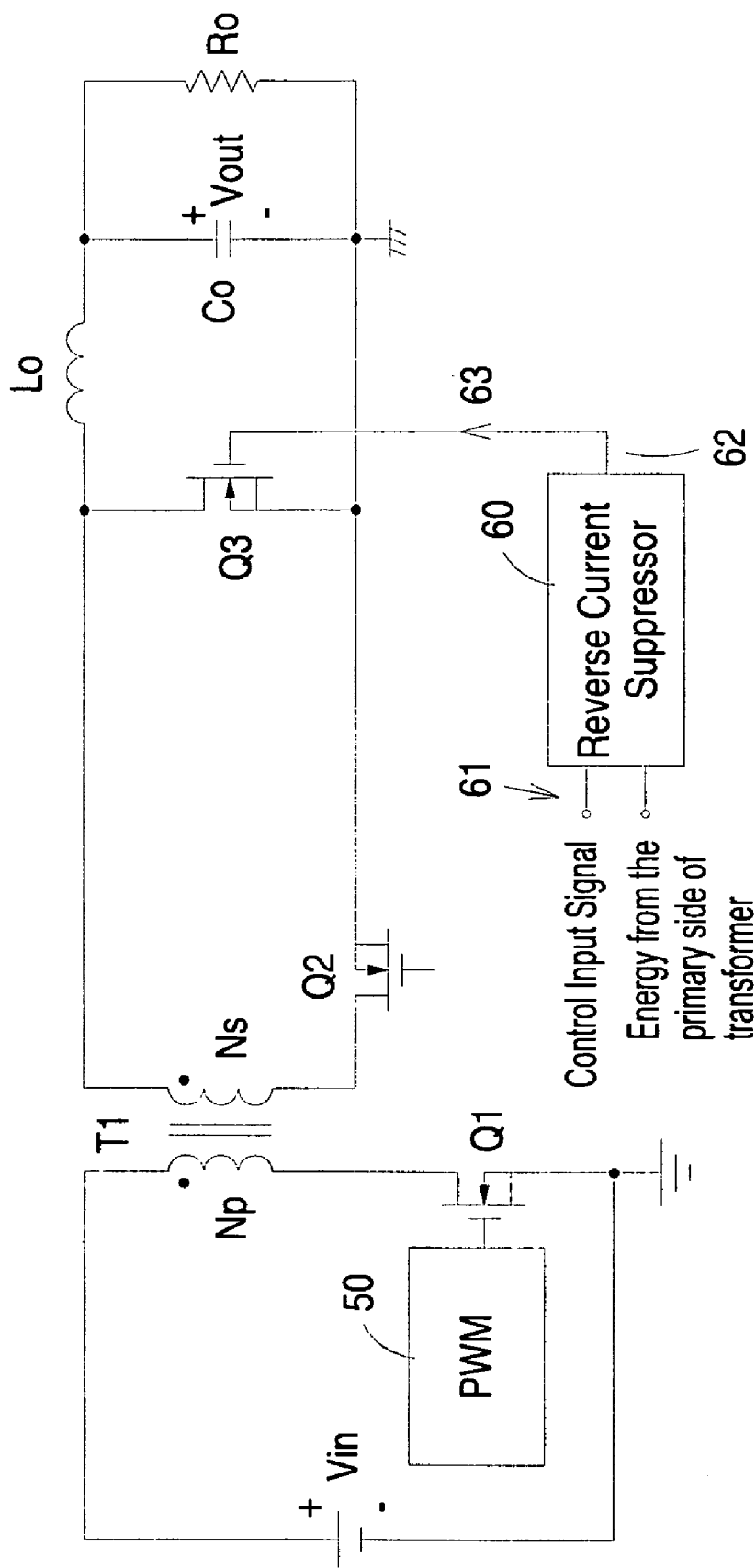
FIG. 4 is a generic representation of a synchronous rectifier forward converter according to the present invention.

A generic representation of the synchronous rectifier forward converter according to the present invention is shown in FIG. 4. As shown in FIG. 4, a synchronous rectifier forward converter includes a transformer T1 having a primary winding Np and a secondary winding Ns, a main switch Q1, and a pulse-width modulator 50 disposed at the primary side of the transformer T1. Besides, a synchronous rectifier (Q2, Q3) and an output filter (Lo, Co) are disposed at the secondary side of the transformer T1, in which the synchronous rectifier (Q2, Q3) includes a forward switch Q2 and a freewheel switch Q3, and the output filter (Lo, Co) includes an output inductor Lo and an output capacitor Co. It is to be noted that the circuit element labeled with the same reference numeral should be directed to the circuit element having the same circuit construction and operation theorem throughout the present invention. Therefore, the circuit elements shown in FIG. 4, including the transformer T1, the main switch Q1, the pulse-width modulator 50, the synchronous rectifier (Q2, Q3), and the output filter (Lo, Co) all have the same circuit construction and operation theorem with the counterparts of FIG. 1.

The converter shown in FIG. 4 further includes a reverse current suppressor 60 having an output terminal 62 connected to the gate of the freewheel switch Q3 and an input terminal 61. The input terminal 61 is configured to receive a control input signal from an internal circuitry of a power supply system in which the forward converter locates or receive the energy transferred from the primary side of the transformer T1 to detect if the forward converter is shut down or a reverse current is generated. If the reverse current suppressor 60 detects that the forward converter is shut down or a reverse current is generated within the forward converter, a turn-off signal 63 is sent through the output terminal 62 to turn off the freewheel switch Q3 immediately. Next, the possible circuit architectures and operation theorems of the reverse current suppressor 60 will be discussed in details with reference to the following embodiments.

The First Embodiment

Figure 5:
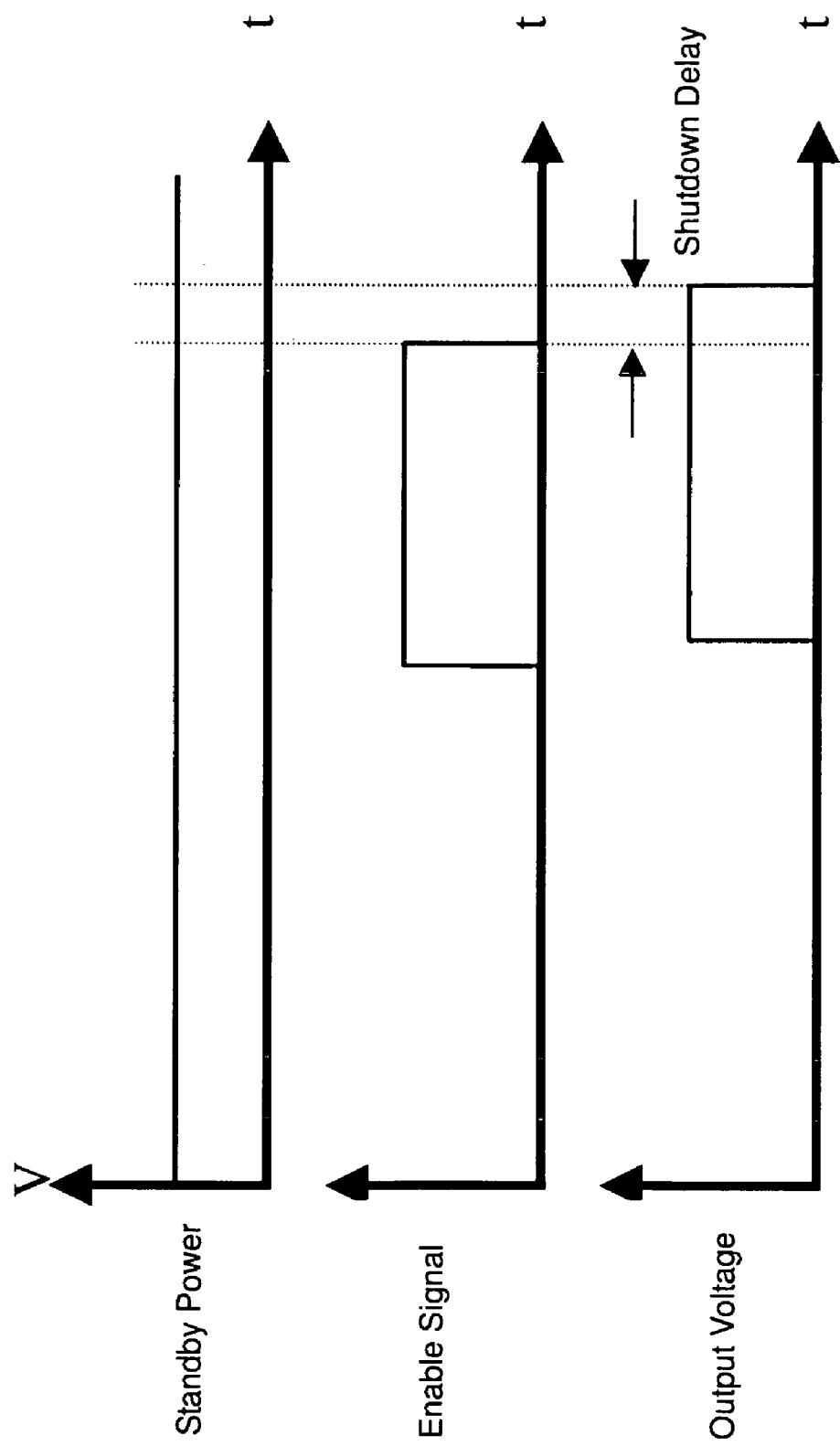
FIG. 5 shows the waveforms of the voltages and control input signals employed in the synchronous rectifier forward converter according to a first preferred embodiment of the present invention.
Figure 6:
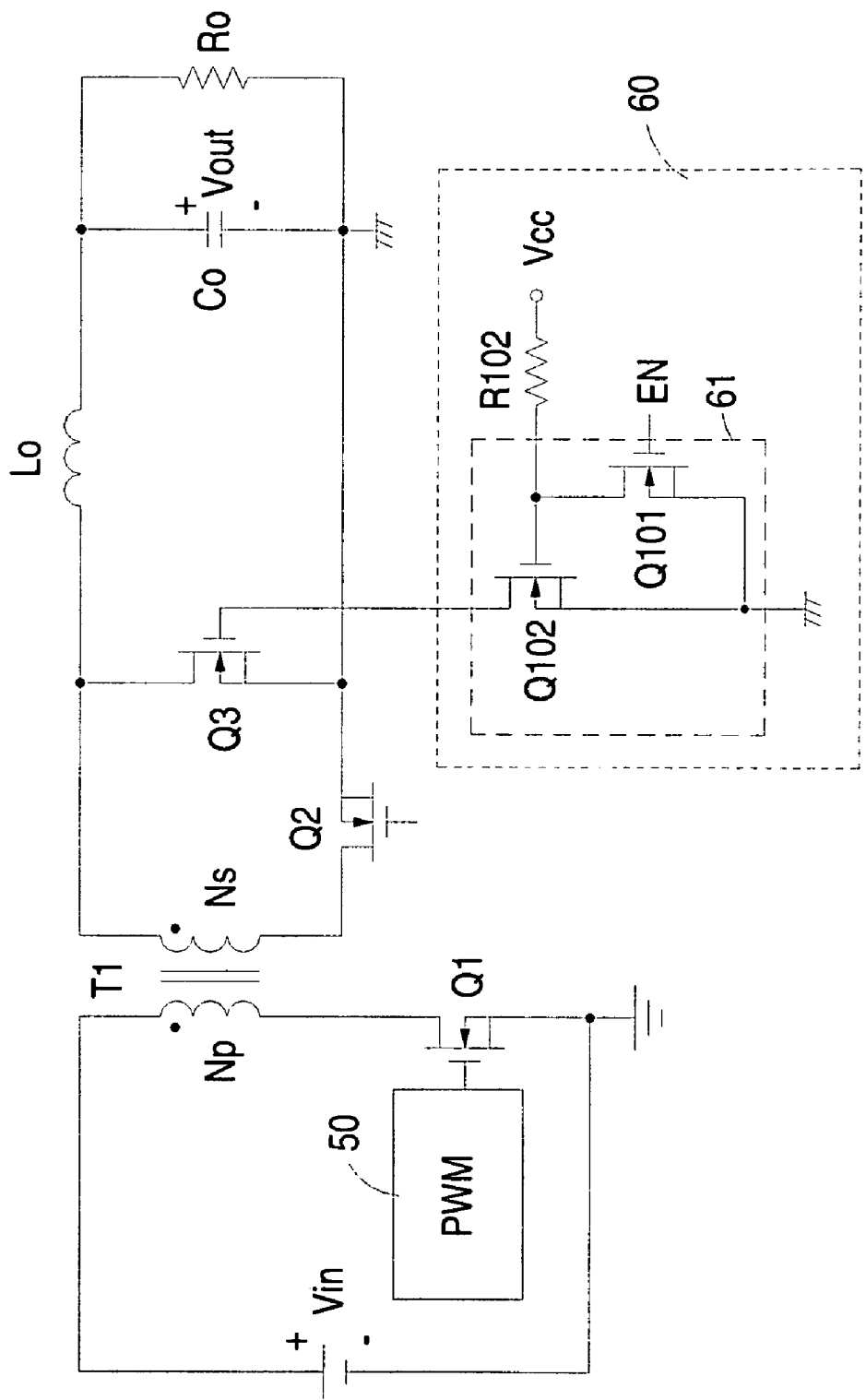
FIG. 6 is a diagrammatic view showing the circuit architecture of a synchronous rectifier forward converter and the reverse current suppressor thereof according to a first preferred embodiment of the present invention.

FIG. 5 is a waveform diagram illustrating the waveforms of the voltage employed in forward converter and the control input signal applied to the reverse current suppressor according to a first embodiment of the present invention. FIG. 6 is a circuit diagram illustrating the circuit architecture of the synchronous rectifier forward converter and the reverse current suppressor thereof according to the first embodiment of the present invention. In the present embodiment, the reverse current suppressor 60 is configured to receive a control input signal to determine if the converter is shut down. It is noteworthy that the phase of the trailing edge of the control input signal will lead the phase of the trailing edge of the output voltage which indicates the point of the interruption of the input power. As shown in FIG. 6, the control input signal is an enable signal EN which is issued by an internal circuitry of the power supply system where the synchronous rectifier forward converter locates. The enable signal EN is used to initiate the power conversion process of the forward converter. FIG. 5 shows the waveforms of the standby power, the enable signal EN and the output voltage. As can be well known by an artisan skilled in the art of power supply circuit, the control mechanism of a power supply can allow the power supply to operate in the standby mode or the main power mode. When the power supply is powered on, the power supply will enter the standby mode first and the standby power of the power supply will provide the required power for the power supply to operate during the startup stage. After the power supply is ready for power output, the internal circuitry of the power supply will issue an enable signal to the synchronous rectifier forward converter to activate the power conversion process. The clocking of the trailing edge of the enable signal EN will be ahead of the clocking of the trailing edge of the output voltage by several microseconds when the synchronous rectifier forward converter is shut down. That is, the phase of the clocking of the enable signal EN will lead the phase of the clocking of the output voltage when the synchronous rectifier forward converter is shut down. Therefore, the enable signal EN will be pulled to the low level prior to the output voltage by several hundred microseconds (about 200 µs), as shown in FIG. 5. Accordingly, it would be useful to employ the phase-lead characteristic of the enable signal with reference to the output voltage when the forward converter is shut down so as to turn off the freewheel switch Q3 before the output voltage is stopped.

The reverse current suppressor 60 of FIG. 6 includes a turn-off signal generator circuit 61 which comprises a first auxiliary switch Q101 and a second auxiliary switch Q102. The first auxiliary switch Q101 has a source terminal connected to ground, a gate terminal connected to the enable signal EN, and a drain terminal connected to a junction node between a resistor R102 and the gate terminal of a second auxiliary switch Q102. The second auxiliary switch Q102 has a source terminal connected to ground, a gate terminal selectively connected to a bias voltage Vcc through the resistor R102, and a drain terminal connected to the gate terminal of the freewheel switch Q3. The operation of the reverse current suppressor 60 is described as follows. When the enable signal EN is in a positive level, the forward converter is working normally to provide a stable and regulated output voltage Vout. In the meantime, the first auxiliary switch Q101 is driven to turn on by the enable signal EN and thus becomes a low-impedance element. Hence, the output signal at the drain terminal of the first auxiliary switch Q101 is in a low level so as to prevent the bias voltage Vcc from being applied to the gate terminal of the second auxiliary switch Q102. Accordingly, the second auxiliary switch Q102 is turned off and thus the output of the forward converter is not affected. When the enable signal EN is in a zero-voltage level, the first auxiliary switch Q101 is driven to turn off by the enable signal EN and thus becomes a high-impedance element. Hence, the output signal at the drain terminal of the first auxiliary switch Q101 is in a high level so as to allow the bias voltage Vcc to be applied to the gate terminal of the second auxiliary switch Q102 through the resistor R102. Thus, the second auxiliary switch Q102 is turned on and a turn-off signal is sent from the drain terminal of the second auxiliary switch Q102 to the gate terminal of the freewheel switch Q3, thereby turning off the freewheel switch Q3. In the present embodiment, the reverse current suppressor 60 does not include any capacitor, so that the reverse current suppressor 60 can promptly send a turn-off signal to the gate terminal of the freewheel switch Q3 without delay when the forward converter is shut down and the enable signal EN transits to the zero-voltage level. In this manner, the reverse current can be effectively suppressed.

Figure 8:
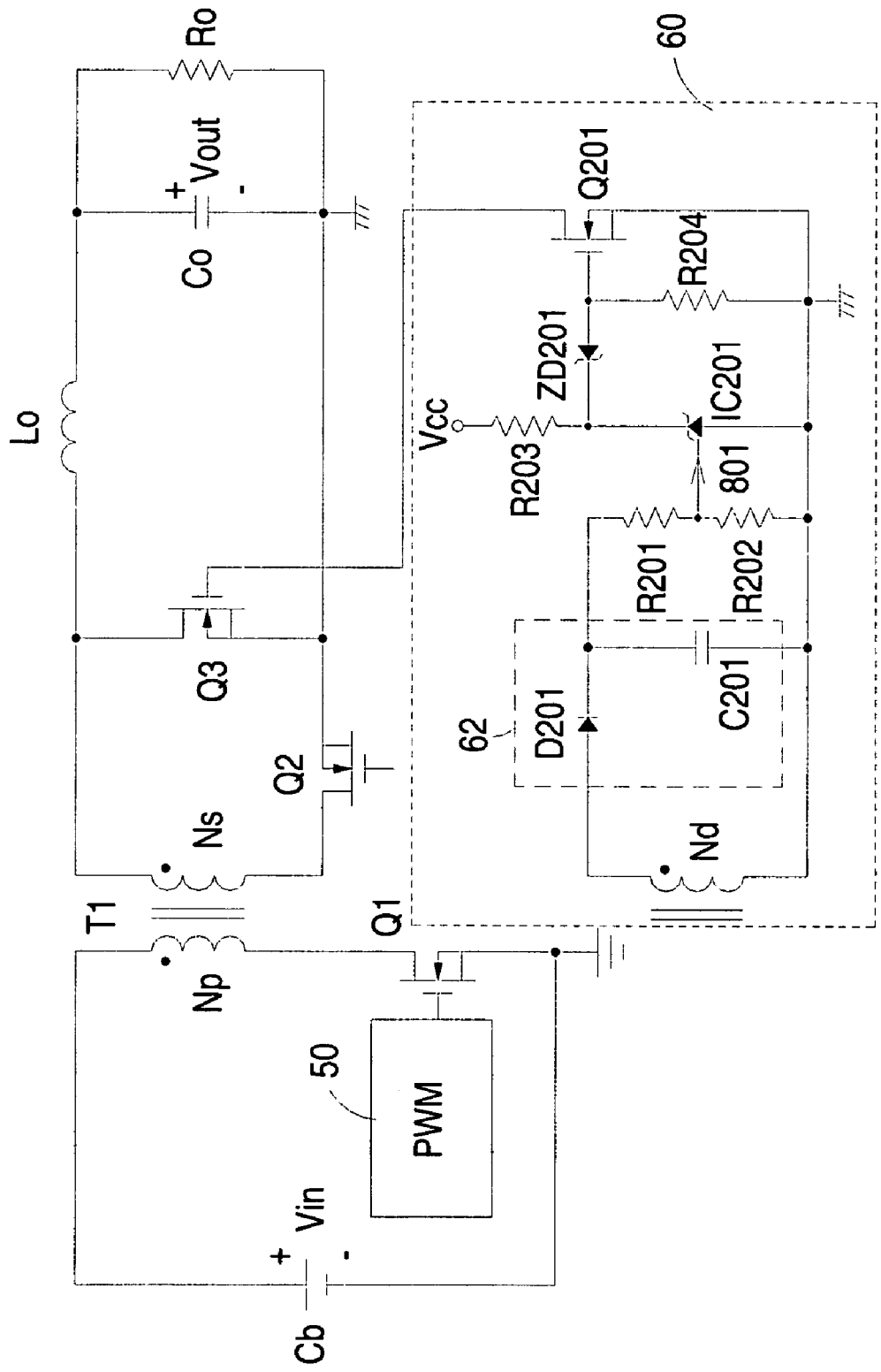
FIG. 8 is a diagrammatic view showing the circuit architecture of a synchronous rectifier forward converter and the reverse current suppressor thereof according to a second preferred embodiment of the present invention.

Based on the foregoing concept, a reverse current suppressor using a different control mechanism and topology with the first embodiment is proposed in the present embodiment. As shown in FIG. 8, a reverse current suppressor 60 according to a second embodiment includes a voltage detection winding Nd disposed at the secondary side of the transformer. The voltage detection winding Nd is configured to receive the energy transferred from the primary winding Np of the transformer T1 and inducing an AC voltage having a voltage level being proportional to the voltage across the secondary side of the transformer T1. The AC voltage across voltage detection winding Nd is rectified by the rectifying diode D201 and the holding capacitor C201 is charged by the rectified voltage, thereby generating a DC voltage across the holding capacitor C201. The rectifying diode D201 and the holding capacitor C201 form a voltage detection signal generator 62 and the voltage across the holding capacitor C201 functions as a voltage detection signal indicative of the voltage across the secondary side of the transformer T1. Therefore, the voltage detection signal (the DC voltage across the holding capacitor C201) represents the voltage across the secondary side of the transformer T1 and varies in synchronization with the input voltage Vin. The reverse current suppressor 60 according to the second embodiment of the present invention further includes a reference input generator which is consisted of voltage-dividing resistors R201 and R202 and configured to divide the voltage detection signal to generate a reference input voltage 801, and a comparator switch IC201 for comparing the reference input voltage 801 with an internal reference voltage (not shown) and in response to the comparison providing an output signal. The reverse current suppressor further includes an auxiliary switch Q201 having a gate terminal connected to ground through a resistor R204, a source terminal connected to ground and a drain terminal connected to the gate terminal of the freewheel switch Q3. The auxiliary switch Q201 is configured to selectively allow the bias voltage Vcc to be applied to its gate terminal according to the output signal of the comparator switch IC201 so as to output a turn-off signal to turn off the freewheel switch Q3 through its drain terminal.

Figure 9:
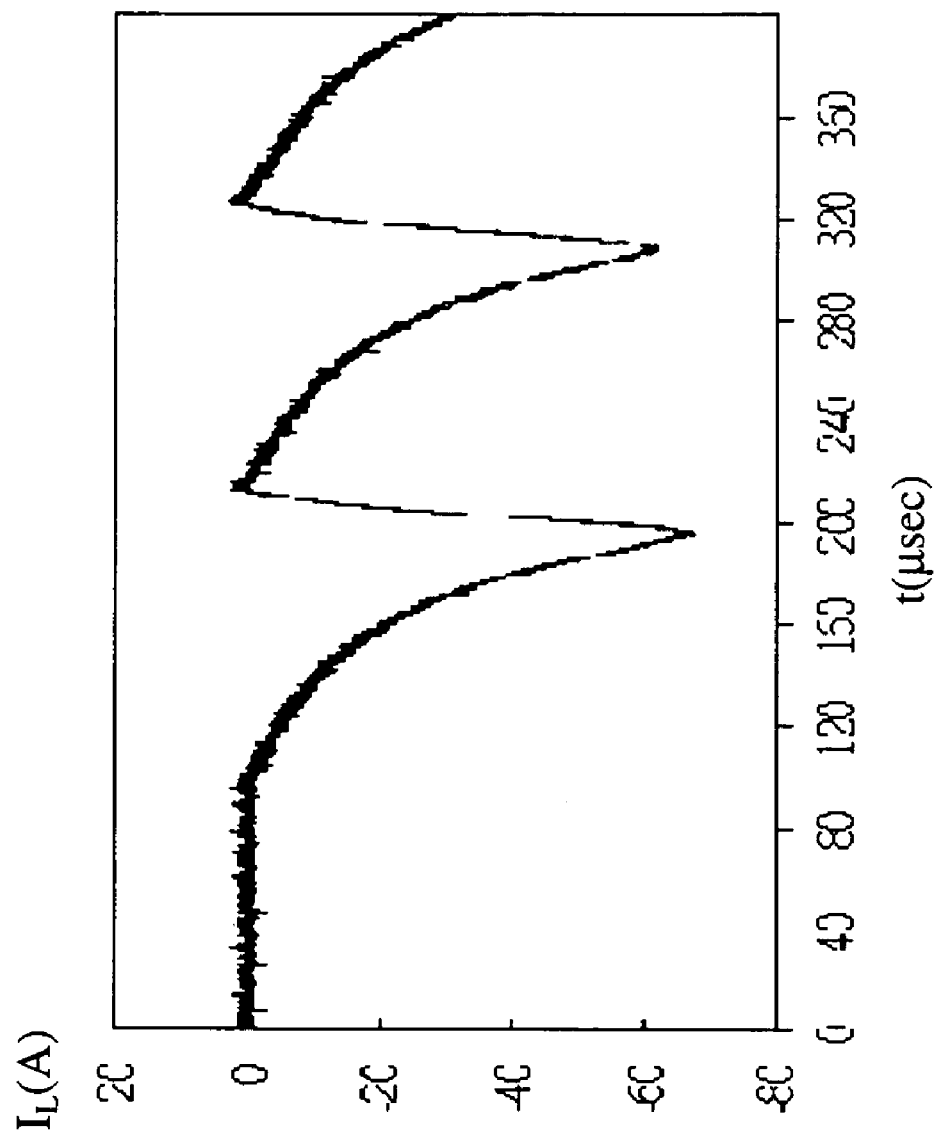
FIG. 9 is a compilation showing the waveform of the reverse current generated during the shutdown of the synchronous rectifier forward converter which is working in a light-load condition.
Figure 10:
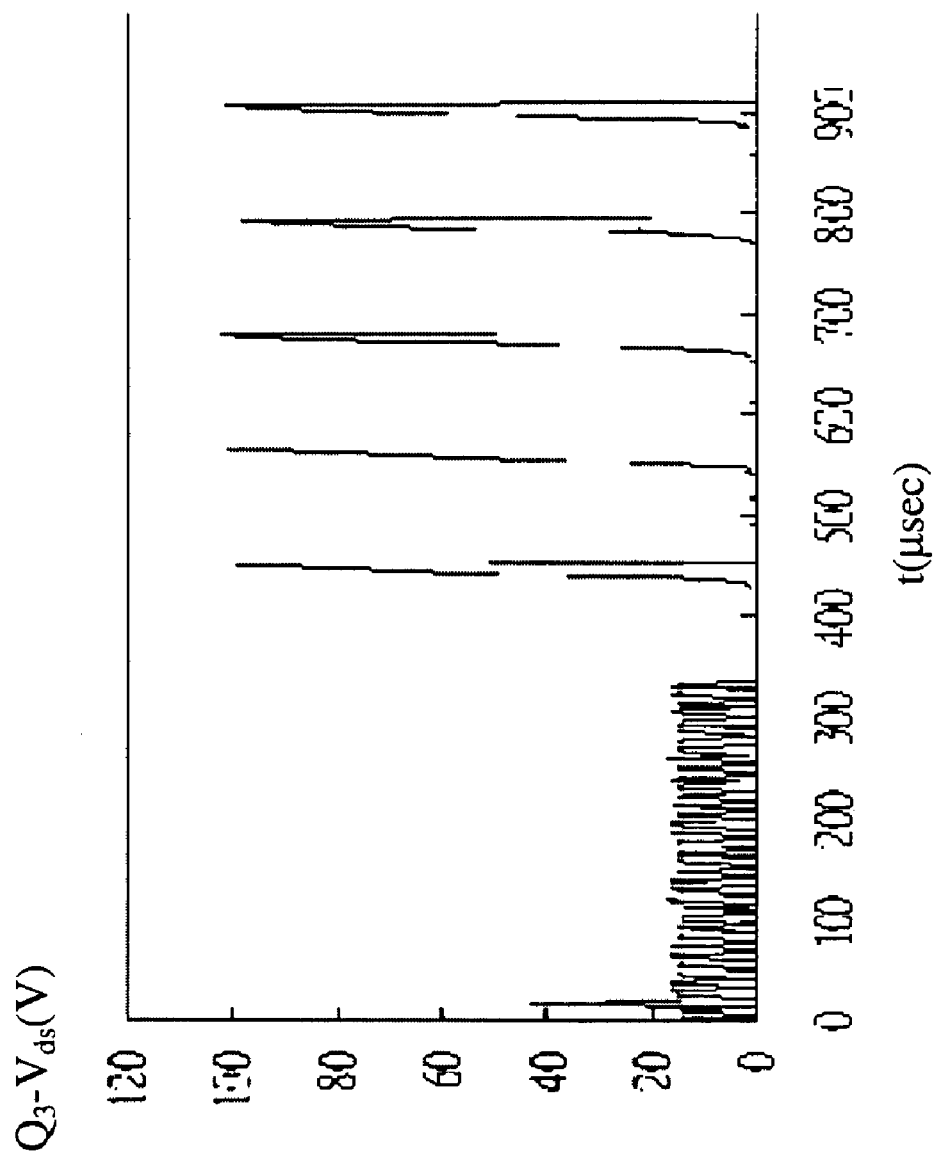
FIG. 10 is a compilation showing the waveform of the voltage spikes generated between the drain terminal and the source terminal of the freewheel switch.
Figure 11:
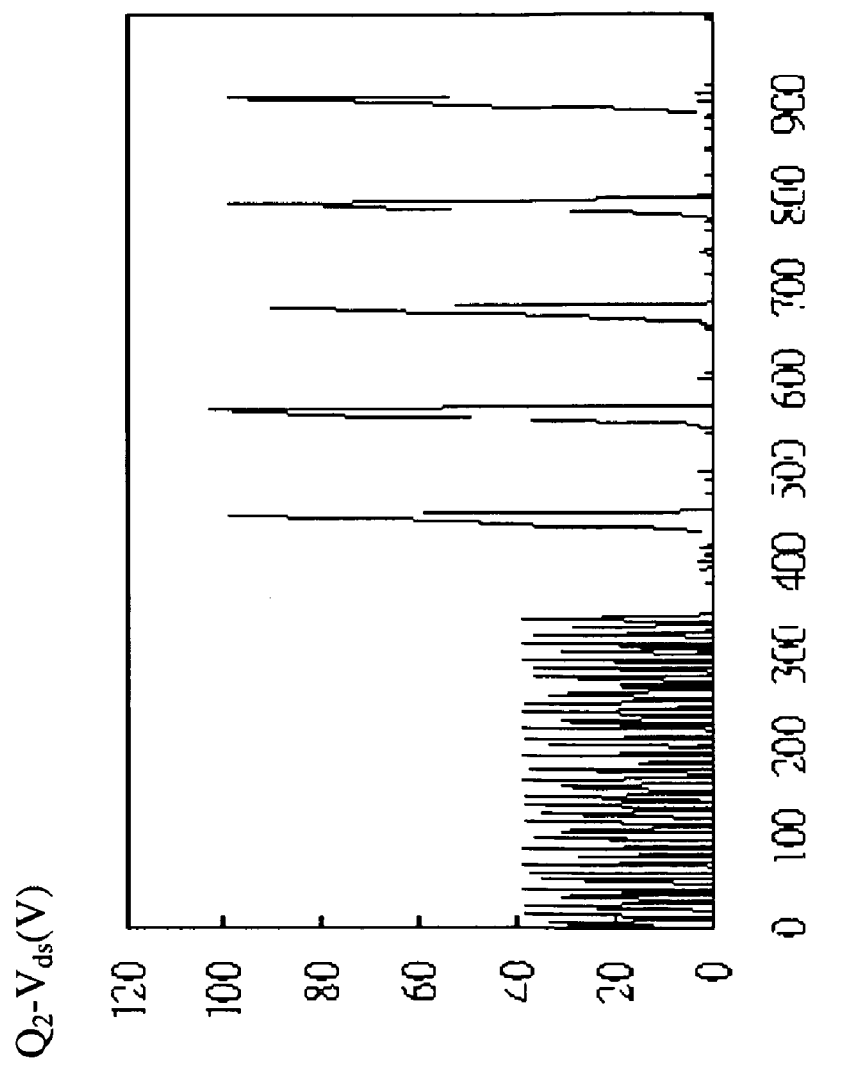
FIG. 11 is a compilation showing the waveform of the voltage spikes generated between the drain terminal and the source terminal of the forward switch.

Performance and Experimental Results:

FIG. 9 shows the waveform of the reverse current generated during the shutdown process of the forward converter which is working in a light-load condition. FIG. 10 shows the waveform of the voltage spikes generated between the drain terminal and the source terminal of the freewheel switch Q3. It can be known from the schematic representation of FIG. 9 and FIG. 10 that when the forward converter is shut down and thus the input power of the converter is interrupted, the forward switch Q2 of the synchronous rectifier will turn off due to the interruption of its gate driving signal. Therefore, the freewheel switch Q3 likes to be connected in parallel with the forward switch Q2, so that a relatively large voltage stress is applied between the drain terminal and the source terminal of the forward switch Q2, thereby generating voltage spikes. FIG. 11 shows the waveform of the voltage spikes generated between the drain terminal and the source terminal of the forward switch Q2.

Figure 12:
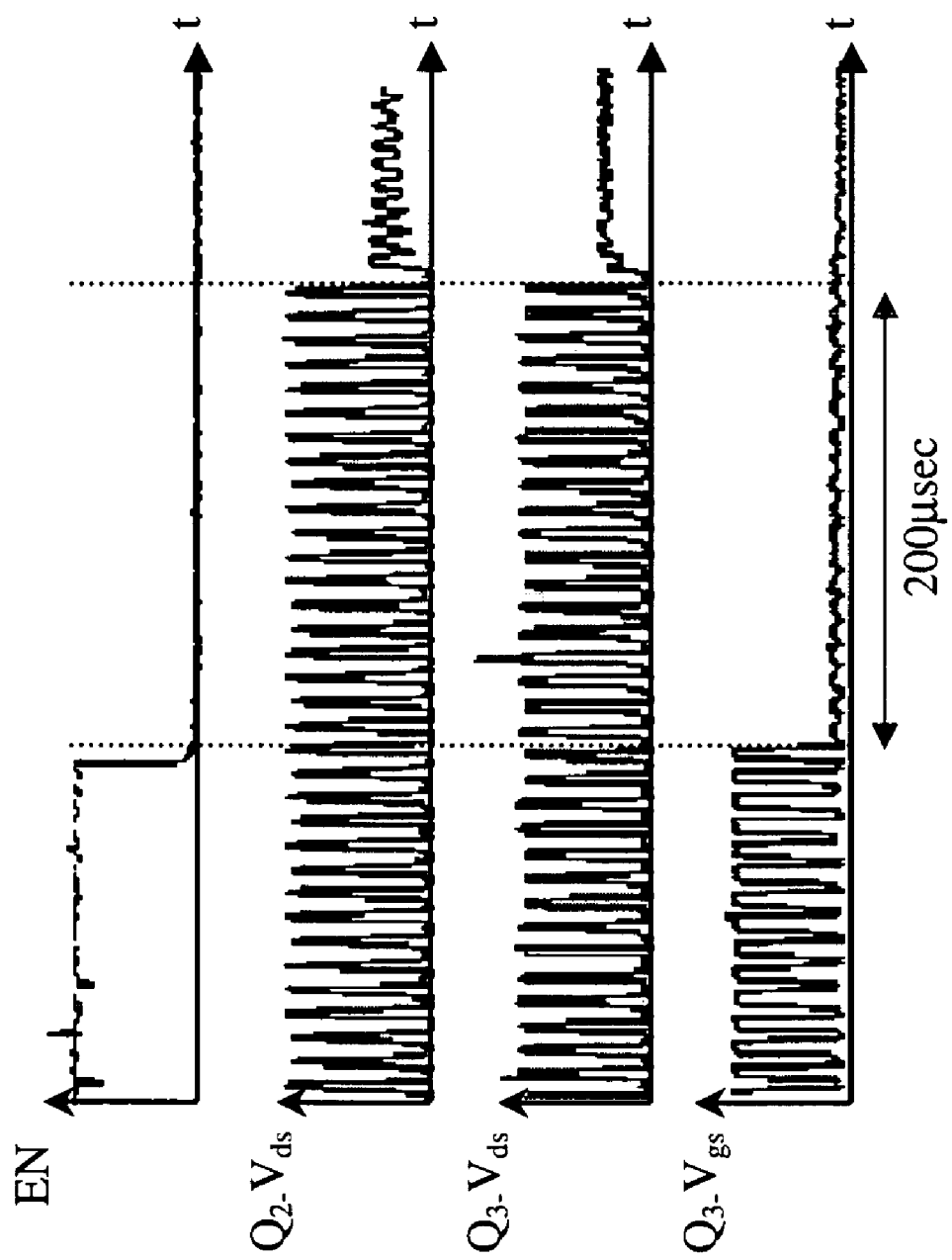
FIG. 12 is a compilation showing the waveforms of the enable signal, the drain-source voltage of the forward switch, the drain-source voltage of the freewheel switch and the gate-source voltage of the freewheel switch according to a first embodiment of the present invention.

FIG. 12 shows the waveforms of the enable signal EN, the drain-source voltage of the forward converter Q2, the drain-source voltage of the freewheel switch Q3 and the gate-source voltage of the freewheel switch Q3 according to the first embodiment of the present invention. As stated above, when the enable signal EN transits to the zero-voltage level, the first auxiliary switch Q101 of the reverse current suppressor 60 according to the first embodiment of the present invention will be driven to turn off by the enable signal EN, so that the second auxiliary switch Q102 of the reverse current suppressor 60 is biased by the bias voltage Vcc to turn on and thereby sending a turn-off signal to turn off the freewheel switch Q3. It can be understood from the waveform diagram of FIG. 12 that the output voltage of the synchronous rectifier forward converter will be stopped after 200 microseconds since the enable signal EN transits to the zero-voltage level. Here, the voltage spikes (Q3-Vds) between the drain terminal and the source terminal of the freewheel switch Q3 and the voltage spikes (Q2-Vds) between the drain terminal and the source terminal of the forward switch Q2 can be significantly suppressed. By using the reverse current suppression technique disclosed in the first embodiment of the present invention, the freewheel switch Q3 can be promptly turn off when the enable signal EN transits to the zero-voltage level, so that the current path of the reverse current can be cut off prior to the stopping of the output voltage of the forward converter. In this manner, the reverse current can be suppressed and the voltage spikes generated between the drain terminal and the source terminal of the forward switch Q2 and the freewheel switch Q3 can avoided.

The Second Embodiment

Figure 7:
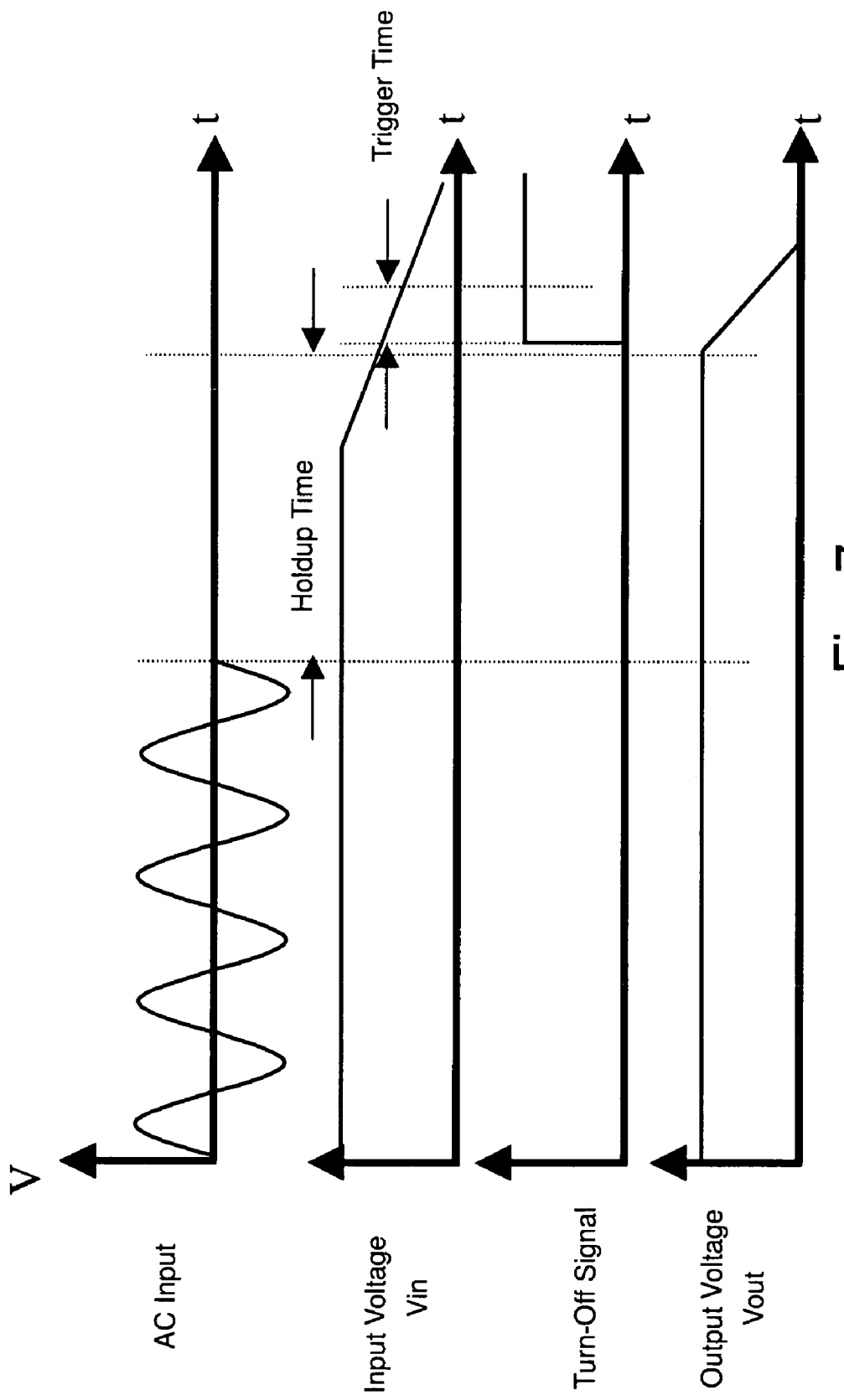
FIG. 7 shows the waveforms of the voltages and control input signals employed in the synchronous rectifier forward converter and the reverse current suppressor thereof according to a second preferred embodiment of the present invention.

A second preferred embodiment of the present invention is illustrated in FIGS. 7 and 8. FIG. 7 shows the waveforms of the voltages and control signals employed in the synchronous rectifier forward converter and the reverse current suppressor thereof according to a second preferred embodiment of the present invention, and FIG. 8 shows a circuit diagram of the synchronous rectifier forward converter and the reverse current suppressor thereof according to a second preferred embodiment of the present invention. In the present embodiment, the reverse current suppressor 60 is configured to generate a voltage detection signal indicative of the voltage across the secondary side of the transformer to detect if a reverse current is generated. In FIG. 8, an input bulk capacitor Cb is connected across the primary side of the transformer and configured to provide an input DC voltage Vin to the forward converter so as to convert the input DC voltage Vin into a regulated output DC voltage Vout. In most practical applications, DC-DC converters always require to comply with the regulations of power hold-up. In other words, the output DC voltage of the DC-DC converter is expected to be regulated for a certain period of time when the input power is interrupted. Therefore, when the input power is interrupted, the input bulk capacitor Cb can discharge the energy stored therein to provide a temporary power for the DC-DC converter. Accordingly, the time for the DC-DC converter to maintain operation when the input power is interrupted is called hold-up time. Generally, the ideal hold-up time that an input bulk capacitor can provide is tens of microseconds. After the hold-up time is expired, the input voltage Vin across the primary side of the transformer can not provide regulation to the output voltage, so that the voltage across the secondary side of the transformer is smaller than the output voltage Vout across the output capacitor Co. In the meantime, the output inductor Lo starts to resonate with the output capacitor Co and thus a reverse current is generated. Therefore, if it is possible to turn off the freewheel switch Q3 when the voltage across the secondary side of the transformer is detected to be smaller than the output voltage Vout, the reverse current can be suppressed efficiently.

Based on the foregoing concept, a reverse current suppressor using a different control mechanism and topology with the first embodiment is proposed in the present embodiment. As shown in FIG. 8, a reverse current suppressor 60 according to a second embodiment includes a voltage detection winding Nd disposed at the secondary side of the transformer. The voltage detection winding Nd is configured to receive the energy transferred from the primary winding Np of the transformer T1 and inducing an AC voltage having a voltage level being proportional to the voltage across the secondary side of the transformer T1. The AC voltage across voltage detection winding Nd is rectified by the rectifying diode D201 and the holding capacitor C201 is charged by the rectified voltage, thereby generating a DC voltage across the holding capacitor C201. The rectifying diode D201 and the holding capacitor C201 form a voltage detection signal generator and the voltage across the holding capacitor C201 functions as a voltage detection signal indicative of the voltage across the secondary side of the transformer T1. Therefore, the voltage detection signal (the DC voltage across the holding capacitor C201) represents the voltage across the secondary side of the transformer T1 and varies in synchronization with the input voltage Vin. The reverse current suppressor 60 according to the second embodiment of the present invention further includes a reference input generator which is consisted of voltage-dividing resistors R201 and R202 and configured to divide the voltage detection signal to generate a reference input voltage 801, and a comparator switch IC201 for comparing the reference input voltage 801 with an internal reference voltage (not shown) and in response to the comparison providing an output signal. The reverse current suppressor further includes an auxiliary switch Q201 having a gate terminal connected to ground through a resistor R204, a source terminal connected to ground and a drain terminal connected to the gate terminal of the freewheel switch Q3. The auxiliary switch Q201 is configured to selectively allow the bias voltage Vcc to be applied to its gate terminal according to the output signal of the comparator switch IC201 so as to output a turn-off signal to turn off the freewheel switch Q3 through its drain terminal.

The operation of the reverse current suppressor 60 of FIG. 8 is described as follows. When the forward converter is operating normally, the voltage detection signal (the voltage across the holding capacitor C201) will maintain its voltage level at a predetermined level (about 10V). That is, when the forward converter is operating normally, the voltage level of the voltage detection signal will be maintained at about 10V. In the present embodiment, a threshold level that is used to detect the reverse current is set to be identical to the voltage level of the internal reference voltage of the comparator switch IC201, for example, 5V. Here, the resistance settings of the voltage-dividing resistors R201 and R202 allows the reference input voltage 801 to be larger than or equal to the threshold level for detecting the reverse current. Therefore, the reference input voltage 801 will be larger than or equal to 5V to turn on the comparator switch IC201 In the meantime, the output signal of the comparator switch IC 201 is high and thereby preventing the bias voltage Vcc from being applied to the gate terminal of the auxiliary switch Q201, and the auxiliary switch Q201 is turned off accordingly. Therefore, the output of the forward converter will not be affected, and the hold-up time of the input bulk capacitor Cb will not be seriously affected. After the hold-up time is expired and voltage across the secondary side of the transformer starts to decay, the AC voltage across the voltage detection winding Nd will vary synchronously so that the AC voltage across the voltage detection winding Nd will decay slowly. When the voltage across the secondary side of the transformer T1 decays to a voltage level fallen in the time zone delimited by the trigger time, the voltage across the secondary side of the transformer is smaller than the output voltage of the forward converter. In the meantime, the voltage level of the voltage detection signal will decay as well so that the reference input voltage 801 is smaller than the threshold value, for example, 5 volts. Here, the voltage level of the voltage detection signal will decay to be smaller than 10 volts, the reference input voltage 801 generated by the reference input generator (R201, R202) will be smaller than 5 volts. Therefore, the comparator switch IC201 can not maintain conducting but transits to a high-impedance state. Consequently, the output signal of the comparator switch IC201 is at a low state to allow the bias voltage Vcc to be applied to the gate terminal of the auxiliary switch Q201 through a resistor R203 and a zener diode ZD201. Hence, the auxiliary switch Q201 will turn on and the freewheel switch Q3 will turn off accordingly, so that the current flowing from the output capacitor Co to the output inductor Lo can not be induced to form a resonant path.

It is noteworthy that the comparator switch IC201 can be implemented by a zener diode having an adjustable breakdown voltage, for example, a TL431 shunt regulator pioneered by Texas Instruments.

Figure 13:
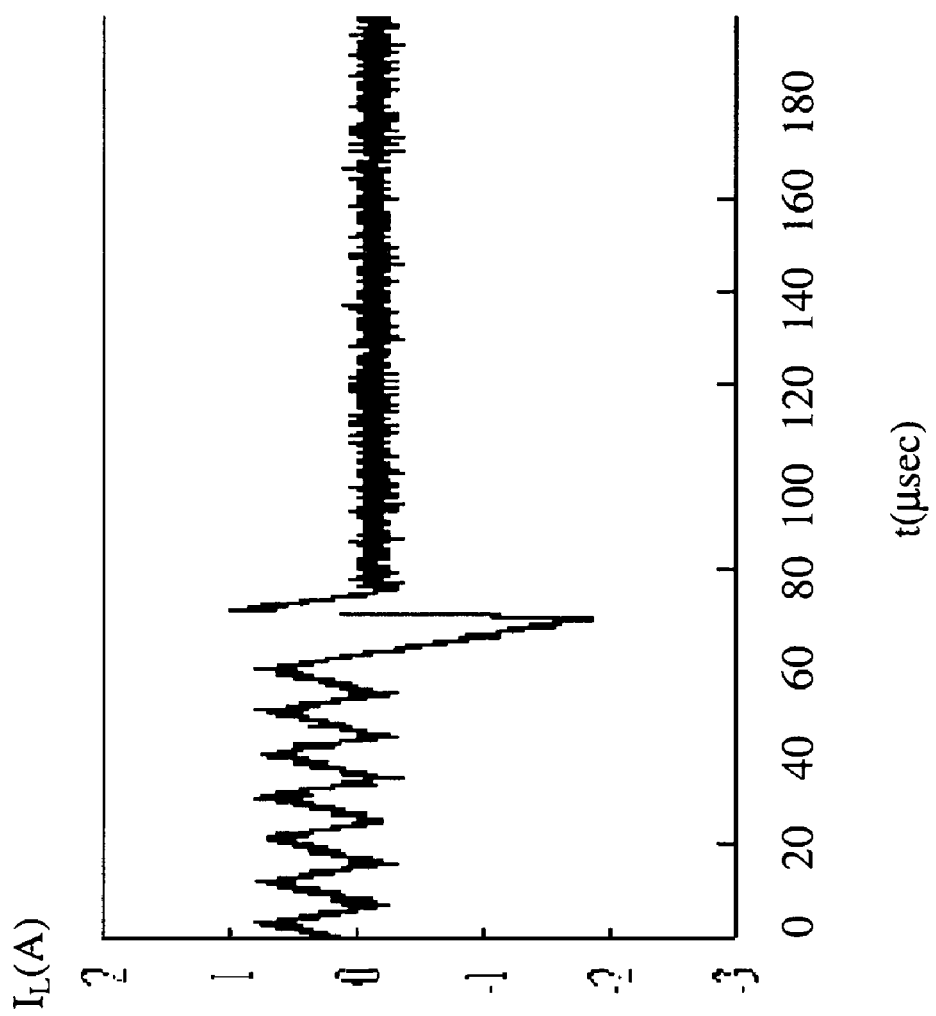
FIG. 13 is a compilation showing the waveform of the inductor current according to a second embodiment of the present invention.

Performance and Experimental Results:

FIG. 13 shows the waveform of the inductor current according to the second embodiment of the present invention. As shown in FIG. 13, although the reverse current suppression technique proposed by the present invention can not completely remove the voltage spikes caused by the reverse current, the reverse current flowing through the output inductor Lo can be reduced to 2 A and the voltage level of the voltage spikes generated between the drain terminal and the source terminal of the freewheel switch Q3 can be limited within the rated voltage of the freewheel switch Q3.

Figure 14:
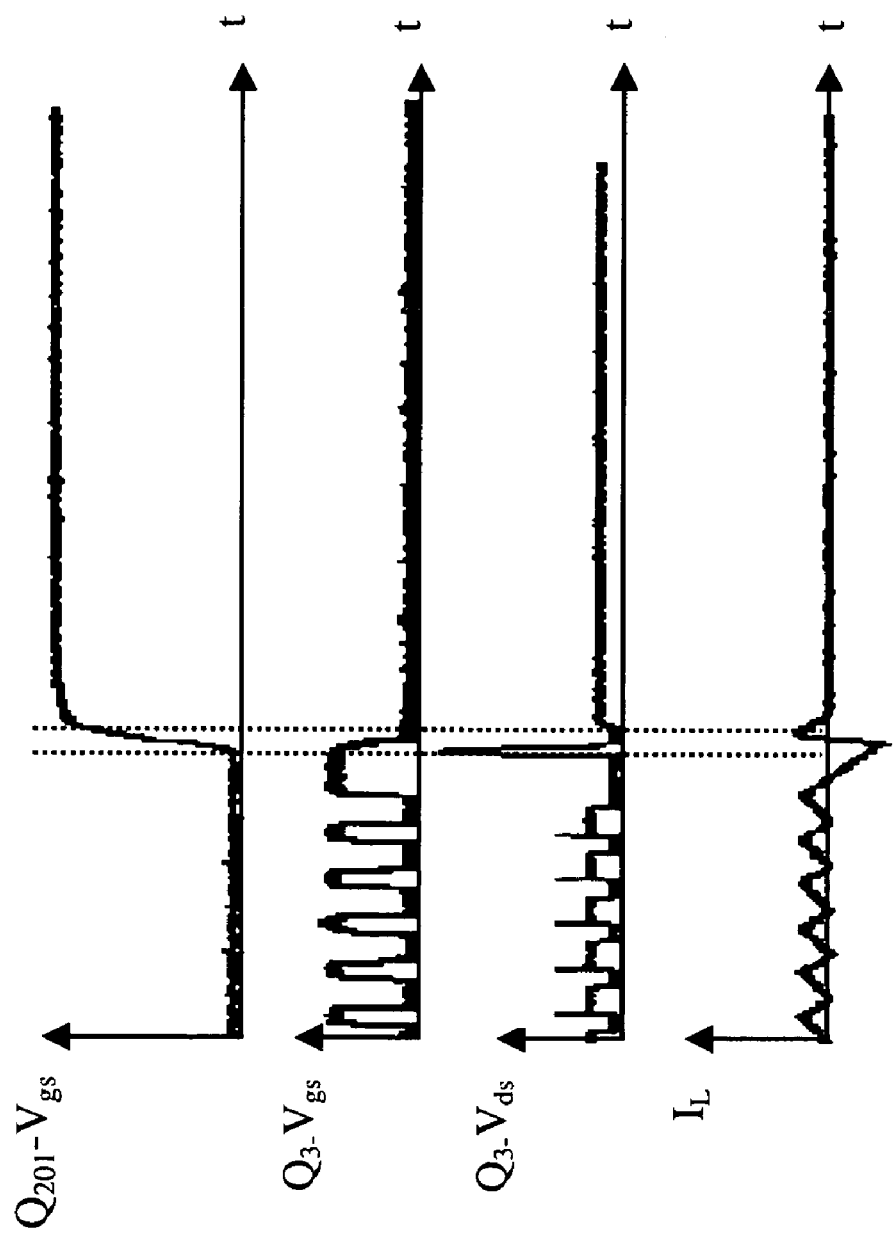
FIG. 14 is a compilation showing the waveforms of the gate-source voltage of the auxiliary switch, the gate-source voltage of the freewheel switch, the drain-source voltage of the freewheel switch and the inductor current according to a second embodiment of the present invention.

FIG. 14 shows the waveforms of the gate-source voltage of the auxiliary switch Q201, the gate-source voltage of the freewheel switch Q3, the drain-source voltage of the freewheel switch Q3 and the inductor current $I_L$. As can be understood from the waveform diagram of FIG. 14, when the forward converter is normally operating, the reference input voltage 801 will be larger than the internal reference voltage of the comparator switch IC201, so that the level of the output signal of the comparator switch IC201 is high, thereby preventing the bias voltage Vcc from being applied to the gate terminal of the auxiliary switch Q201. In the meantime, the gate-source voltage of the auxiliary switch Q201 is in a low level and the auxiliary switch Q201 is turned off, and the current value of the inductor current $I_L$ is positive. When the input power of the forward converter is interrupted and the voltage across the secondary side of the transformer T1 has not decayed to be smaller than the output voltage Vout, the output inductor Lo will resonate with the output capacitor Co, and thereby reversing the flow direction of the inductor current $I_L$ and generating voltage spikes between the drain terminal and the source terminal of the freewheel switch Q3. After the hold-up time of the input bulk capacitor Cb is expired and the voltage across the secondary side of the transformer T1 has decayed to be smaller than the output voltage Vout, the reference input voltage 801 will drop down to be smaller than the internal reference voltage of the comparator switch IC201, so that the comparator switch IC201 is turned off and thus the output signal of the comparator switch IC201 is in a low state, thereby allowing the bias voltage Vcc to be applied to the gate of auxiliary switch Q201. Here, the gate-source voltage of the auxiliary switch Q201 is in a high level and the auxiliary switch Q201 is turned on, thereby turning off the freewheel switch Q3. In this manner, the reverse current flowing through the output inductor Lo will be significantly reduced because the resonance between the output inductor Lo and the output capacitor Co can not continue. Further, the voltage spikes generated between the drain terminal and the source terminal of freewheel switch Q3 can be suppressed.

In conclusion, a feasible scheme of the proposed reverse current suppression technique for the synchronous rectifier forward converter according to the present invention employs the enable signal provided by an internal circuitry of the power supply system to determine if the input power of the forward converter is interrupted due to the shutdown of the forward converter beforehand, and turn off the freewheel switch if the input power of the forward converter is interrupted so as to prevent the reverse current to be generated in the forward converter and prevent the voltage spikes to be generated between the drain terminal and the source terminal of the freewheel switch. Another feasible scheme of the proposed reverse current suppression technique for the synchronous rectifier forward converter according to the present invention employs a voltage detection winding disposed at the secondary side and a voltage detection signal generator to generate a voltage detection signal indicative of the voltage across the secondary side of the transformer. Next, the voltage detection signal is converted by a reference input generator into a reference input voltage. The detection of whether the voltage across the secondary side of the transformer is smaller than the output voltage Vout of the forward converter, that is, the detection of whether the reverse current is generated due to the resonance between the output inductor Lo and the output capacitor Co is carried out by determining if the reference input voltage is smaller than the internal reference voltage of the comparator switch. The comparator switch is configured to provide an output signal based on the comparison of the reference input voltage and its internal reference voltage. If the reference input voltage is smaller than the internal reference voltage of the comparator switch, the output signal of the comparator switch will be in a low level so that a bias voltage is applied to the gate terminal of the auxiliary switch, thereby turning on the auxiliary switch. Here, the auxiliary switch can send a turn-off signal through its drain terminal to the gate terminal of the freewheel switch to turn off the freewheel switch, and thereby suppressing the reverse current generated in the synchronous rectifier and preventing the voltage spikes generated between the drain terminal and the source terminal of the freewheel switch. It goes without saying that the reverse current suppressor of the present invention is advantageous by using a simple circuit architecture and control mechanism for manipulating the freewheel switch to turn off when the input power of the forward converter is interrupted or before the reverse current is generated, thereby suppressing the reverse current and preventing the damages caused by voltage spikes, so as to attain a cost-effective and fast-response reverse current generator.

Those of skilled in the art will recognize that these and other modifications can be made within the spirit and scope of the present invention as further defined in the appended claims.

What is claimed is:

1. A synchronous rectifier forward converter comprising:
   a transformer having a primary winding and a secondary winding;
   a main switch connected in series with the primary winding, wherein the energy stored in the primary winding is transferred to the secondary winding according to on/off operations of the main switch;
   a synchronous rectifier including a forward switch and a freewheel switch and connected to the secondary winding, and configured to convert the energy received by the secondary winding into a regulated output voltage; and
   a reverse current suppressor having an input terminal for receiving a control input signal and an turn-off signal generator circuit configured to be driven by the control input signal to generate a turn-off signal to turn off the freewheel switch when the synchronous rectifier forward converter is shut down, wherein the control input signal has a characteristic that the control input signal stands in a first level when the synchronous rectifier forward converter is normally operating and the control input signal transits to a second level in a while after the input power of the synchronous rectifier forward converter is interrupted.

2. The synchronous rectifier forward converter according to claim 1 further comprising an output filter comprising an output inductor and an output capacitor.

3. The synchronous rectifier forward converter according to claim 1 wherein the control input signal is an enable signal.

4. The synchronous rectifier forward converter according to claim 1 wherein the turn-off signal generator circuit comprises:
   a first auxiliary switch having a gate connected to the control input signal and driven by the control input signal to provide an output signal; and
   a second auxiliary switch having a gate for selectively connected to a bias voltage according to the output signal of the first auxiliary switch so as to generate the turn-off signal.

5. The synchronous rectifier forward converter according to claim 4 wherein both of the first auxiliary switch and the second auxiliary switch are implemented by a MOS transistor.

6. A synchronous rectifier forward converter comprising:
   a transformer having a primary winding and a secondary winding;
   a main switch connected in series with the primary winding, wherein the energy stored in the primary winding is transferred to the secondary winding according to on/off operations of the main switch;
   a synchronous rectifier including a forward switch and a freewheel switch and connected to the secondary winding, and configured to convert the energy received by the secondary winding into a regulated output voltage; and
   a reverse current suppressor having an input terminal for receiving the energy transmitted from the primary winding of the transformer for generating a voltage detection signal indicative of a voltage across the secondary winding of the transformer, and configured to determine if the voltage across the secondary winding of the transformer is smaller than an output voltage of the synchronous rectifier forward converter when an input power of the synchronous rectifier forward converter is interrupted, thereby generating a turn-off signal to turn off the freewheel switch when the voltage across the secondary winding of the transformer is smaller than an output voltage of the synchronous rectifier forward converter.

7. The synchronous rectifier forward converter according to claim 6 further comprising an output filter comprising an output inductor and an output capacitor.

8. The synchronous rectifier forward converter according to claim 6 wherein the input terminal of the reverse current suppressor is implemented by a voltage detection winding disposed at the secondary side of the transformer.

9. The synchronous rectifier forward converter according to claim 8 wherein the reverse current suppressor further comprises a voltage detection signal generator which is configured to convert the energy received by the voltage detection winding into the voltage detection signal.

10. The synchronous rectifier forward converter according to claim 9 wherein the voltage detection signal generator comprises a rectifying diode and a holding capacitor.

11. The synchronous rectifier forward converter according to claim 10 wherein the voltage detection signal is a DC voltage across the holding capacitor.

12. The synchronous rectifier forward converter according to claim 11 wherein the reverse current suppressor further comprises a reference input generator for converting the voltage detection signal into a reference input voltage.

13. The synchronous rectifier forward converter according to claim 12 wherein the reference input generator comprises a plurality of voltage-dividing resistors.

14. The synchronous rectifier forward converter according to claim 12 wherein the reverse current suppressor further comprises a comparator switch for comparing the reference input voltage with an internal reference voltage of the comparator switch and in response thereto providing an output signal.

15. The synchronous rectifier forward converter according to claim 14 wherein the comparator switch comprises a zener diode having an adjustable breakdown voltage.

16. The synchronous rectifier forward converter according to claim 14 wherein the reverse current suppressor further comprises an auxiliary switch for being selectively connected to a bias voltage according to the output signal of the comparator switch so as to generate the turn-off signal.

* * * * *